Patented Mar. 5, 1935

1,993,253

UNITED STATES PATENT OFFICE 1,993,253

MANUFACTURE OF MONOMETHYL-PARA-AMINOPHENOL AND ITS SULPHATE

Charles H. W. Whitaker, Marietta, Ohio, assignor of seventy-five one-hundredths to Industrial Dyestuff Company, East Providence, R. I., a corporation of Rhode Island No Drawing. Application September 18, 1934, Serial No. 744,609

17 Claims. (Cl. 260—128)

The instant application is a continuation in part of my earlier application, Serial No. 680,507, filed July 14, 1933.

This invention relates to improvements in the manufacture of N-methyl-para-aminophenol sulphate, and more particularly to improvements in the process of converting para-hydroxy-phenylglycine into N-monomethyl-para-aminophenol, which, in turn, is converted into the sulphate.

It is well known that by heating para-hydroxyphenylglycine in the presence of a large excess of phenol to about 170° C., decomposition of the glycine occurs with the formation of N-methylpara-aminophenol. It has recently been proposed to employ an excess of cresylic acid or other protective media, such as xylenols, thymol, carvacrol, and benzaldehyde, in place of phenol, at temperatures ranging from 165° C. to 185° C. The proportions of these media employed are generally from ten to twelve times the weight of the glycine.

It has been extremely difficult to find media which are not required in such large amounts in order to complete the decomposition of the glycine in a reasonable time and which do not resinify when heated for long periods in contact with methylated aminophenol, especially when used in large scale production in the factory. It has also been difficult to prevent decomposition of N-methyl-para-aminophenol formed during the heat treatment. Decomposition of the N-methylpara-aminophenol and resinification seriously affect the yield of the finished N-methyl-paraaminophenol sulphate, as well as the recovery of the media.

An object of the present invention is, therefore, to provide a process in which the aforesaid difficulties, particularly that of preventing resinification and that of preventing decomposition of the end product, are overcome.

A further object is to provide a highly efficient process in which parahydroxyphenylglycine is decomposed under controlled conditions in a fluid medium of such a nature as will cause a rupture of the glycine grouping at a relatively low temperature and bring about the completion of the reaction in a relatively short time.

Another object is to provide a relatively inexpensive process by which to carry on the above reaction, and which process permits of practically complete recovery of the final product and of the media in which the reaction is carried on.

The media which are employed in the present process and have been found to be most successful are the products of the hydrogenation of phenols. Esters of the alcohols formed by hydrogenation of phenols may also be employed.

Of the hydrogenation productions of the various phenols, I have found that the most efficient is the ketonic derivative formed by the hydrogenation of a mixture of the three isomeric cresols, commonly referred to as methyl cyclohexanone. It has the empirical formula $C_7H_{12}O$. The technical form of this product, usuallly containing about ten per cent of the corresponding alcohol, methyl cyclohexanol, and having a boiling point which varies between about 160° and 170° C., is well suited for this purpose.

The following examples serve to illustrate the present invention:

*Example 1.*—Into a suitable apparatus charge 350 pounds of technical methyl cyclohexanone and add 70 pounds of dry, powdered para-hydroxyphenylglycine. The mass is now stirred and heated to attain a temperature of about 140° to about 145° centigrade. The temperature is now maintained at this point and the whole stirred for about ninety minutes, until inspection of a sample shows that a complete solution has been obtained, following which it can be concluded that decomposition is at an end. The mass in the apparatus is now cooled externally to about 20° centigrade, whereupon it is diluted by the addition of about 250 pounds of ethyl alcohol and the whole well mixed. The diluted mass is now treated with the stoichiometric amount of concentrated sulphuric acid, taking care that the temperature of the mixture does not exceed about 30° centigrade. As soon as the sulphuric acid has been added, the sulphate of N-monomethyl-paraaminophenol separates from the solution and after stirring the mass for a few hours it is filtered off and washed with ethyl alcohol until the mother liquor has been removed. The residue is now dried and may be recrystallized, if desired. The N-monomethyl-para-aminophenol sulphate is obtained in excellent yield and high purity. By the distillation of the filtrate, the alcohol and methyl cyclohexanone are recovered with but small losses, following which they are used in a subsequent batch.

*Example 2.*—Into an apparatus similar to that used in Example 1, charge 350 pounds of methyl cyclohexanone of technical grade and heat the fluid to a temperature of about 140° to about 145° centigrade. At this point, the heating is so regulated as to keep the temperature about constant at the temperature stated. During a period of about one hour, charge 70 pounds of dry, powdered para-hydroxy-phenylglycine, the addition being made in small portions at regular intervals. After all the powder has been added, the mass is stirred and heated at about 140° to 145° centigrade, until, on inspection, it is found that a complete solution has been attained, after which the heating is stopped, the apparatus externally cooled and the internal temperature of the mass reduced to 20° centigrade, or thereabouts. The product in the apparatus can now be worked up according to the procedure used in the above Example 1, or as follows: Add about 700 pounds of water to the mass, stir thoroughly and add the necessary amount of sulphuric acid to neutralize the N-methyl-para-aminophenol base and form its sulphate. The whole is now heated to about 80° centigrade, and is then run into a separatory vessel whereby the aqueous layer, consisting of a solution of N-monomethyl-para-aminophenol sulphate in water, can be separated from the residual methyl cyclohexanone. Following this, the methyl cyclohexanone can be once more extracted with water and acid and, finally, the two extractions are united and evaporated down to dryness, preferably in a vacuum, to avoid oxidation by air as much as possible. The dry product thus obtained is now, preferably, ground to a powder, mixed with three or four times its weight of alcohol, heated to a boil, allowed to cool down, filtered off and dried. It is now obtained in a state of high purity, but may be recrystallized from water, if desired.

Although, in the above examples, use is made of technical methyl cyclohexanone, the reaction can be carried out with success by the use of the ketonic product formed by the hydrogenation of either ortho, meta, or para cresol, although in these cases the cost of operation is increased materially. Furthermore, I am not restricted solely to the employment of the hydrogenation products of cresols, since I have found that products of the hydrogenation of phenols, in general, give results superior to those obtained by the use of the phenols from which the hydrogenation products are derived. I have also found that esters of the alcohols formed by hydrogenating phenols can be used successfully.

The following examples will serve to illustrate the utilization of the esters of the alcohols formed by hydrogenating phenolic bodies:

*Example 3.*—15 parts (by weight) of parahydroxy-phenylglycine are mixed with 225 parts (by weight) of the acetic ester of cyclohexanole (cyclohexanole acetate) and the mixture stirred and heated to 170° centigrade. The whole is stirred at 170° to 180° centigrade in a closed vessel, fitted with a descending condenser, which latter condenses any cyclohexanone acetate which is entrained by the gas evolution. From time to time the gas escaping through the condenser is tested for presence of carbon dioxide, and when it is found that no more carbon dioxide is being liberated the heating is interrupted and the reaction vessel is externally cooled to room temperature. The contents of the vessel are treated with about 100 parts of ethyl alcohol, and the whole filtered to remove any dirt or tarry matter. The filtrate is now treated with concentrated sulphuric acid at about room temperature until a test shows that the further addition of acid does not cause any further precipitation. At this point, the sulphate of monomethyl-para-aminophenol is out of solution in a microcrystalline form. The precipitate is then filtered off and washed with ethyl alcohol until free from mother liquor, following which it may be directly dried or given one or more recrystallizations from water, using a suitable amount of decolorizing charcoal to assist purification.

*Example 4.*—15 parts (by weight) of parahydroxy-phenylglycine is mixed with 225 parts (by weight) of methyl cyclohexanole acetate (by which is meant the acetic acid ester of the alcohol formed by the hydrogenation of a mixture of ortho, meta and para cresols) in a closed vessel, fitted with a descending condenser, as was described in Example 1. The mixture is agitated and the temperature maintained at about 180° centigrade until a test shows that no more carbon dioxide is evolved. The further working is then carried out precisely as given in Example 3.

*Example 5.*—15 parts (by weight) of parahydroxy-phenylglycine is mixed with 225 parts of methyl cyclohexanole benzoate, and the mass placed in a reaction vessel of the type referred to in Example 3. The whole is then heated at about 185° centigrade until no further evolution of carbon dioxide is apparent, following which the further working is exactly as already given in Example 3.

The detailed examples given above indicate that the proportion of solvent medium, mentioned specifically as methyl cyclohexanone, is five times the weight of the glycine. It is to be understood, however, that a considerable variation is permissible without departing from the spirit of the invention. If the medium is used to the extent of twice the weight of the glycine, a longer time and a higher temperature is required to complete the reaction than if the medium is used to the extent of, for instance, twenty times the weight of the glycine.

It has further been found in the process of the present invention that the reaction proceeds advantageously when the parahydroxyphenylglycine is added to a mixture of a phenol or phenols and the hydrogenation product or products of a phenol or phenols. In this case, the advantage that such a procedure has over a procedure in which phenol or phenols are used alone, is substantially in direct proportion to the concentration of the hydrogenated product in the medium. The untreated phenol merely dilutes the beneficial effects of the hydrogenated phenol.

What I claim is:

1. A process of manufacturing monomethyl-para-aminophenol, which process comprises decomposing parahydroxyphenylglycine to monomethyl-para-aminophenol in a medium containing essentially a hydrogenated phenol product.

2. A process of manufacturing monomethyl-para-aminophenol, which process comprises decomposing para-hydroxyphenlyglycine to monomethyl-para-aminophenol in a medium containing essentially an ester of alcohol formed by the hydrogenation of a phenol.

3. A process of manufacturing monomethyl-para-aminophenol, which process comprises decomposing para-hydroxyphenlyglycine to monomethyl-para-aminophenol in a medium containing essentially acetic ester of cyclohexanole (cyclohexanole acetate).

4. In the process set forth in claim 3, the steps consisting in mixing 15 parts, by weight, of para-hydroxyphenylglycine with 225 parts, by weight, of the acetic ester of cyclohexanole (cyclohexanole acetate), stirring the mixture and heating it to from 170° to 180° centigrade in a closed vessel, interrupting heating of the mixture when liberation of carbon dioxide has ceased and cooling it to room temperature, treating the cooled mixture with 100 parts of ethyl alcohol and filtering to remove dirt or tarry matter, treating the filtrate with concentrated sulphuric acid to produce the sulphate of monomethyl-para-aminophenol, and then filtering off and washing the precipitate with ethyl alcohol until free from mother liquor.

5. A process of manufacturing monomethyl-para-aminophenol, which process comprises decomposing para-hydroxyphenylglycine to monomethyl-para-aminophenol in a medium containing essentially methyl cyclohexanole acetate.

6. In the process set forth in claim 5, the steps consisting in mixing 15 parts, by weight, of para-hydroxyphenylglycine with 225 parts of methyl cyclohexanole acetate (the acetic acid ester of the alcohol formed by the hydrogenation of a mixture of ortho, meta and para cresols), agitating the mixture while maintaining it to a temperature of about 180° centigrade until liberation of carbon dioxide has ceased, then cooling it to room temperature, treating the cooled mixture with 100 parts of ethyl alcohol and filtering to remove dirt or tarry matter, treating the filtrate with concentrated sulphuric acid, and then filtering off and washing the precipitate with ethyl alcohol until free from mother liquor.

7. A process of manufacturing monomethyl-para-aminophenol, which process comprises decomposing para-hydroxyphenylglycine to monomethyl-para-aminophenol in a medium containing essentially methyl cyclohexanole benzoate.

8. In the process set forth in claim 7, the steps consisting in mixing 15 parts, by weight, of para-hydroxyphenylglycine with 225 parts of methyl cyclohexanole benzoate, agitating the mixture while maintaining it to a temperature of about 185° centigrade until liberation of carbon dioxide has ceased, then cooling it to room temperature, treating the cooled mixture with 100 parts of ethyl alcohol and filtering to remove dirt and tarry matter, treating the filtrate with concentrated sulphuric acid, and then filtering off and washing the precipitate with ethyl alcohol until free from mother liquor.

9. A process of manufacturing monomethyl-para-aminophenol, which process comprises decomposing para-hydroxyphenylglycine to monomethyl-para-aminophenol in a medium containing essentially methyl cyclohexanone.

10. A process of manufacturing monomethyl-para-aminophenol, which process comprises decomposing para-hydroxyphenylglycine to monomethyl-para-aminophenol in a medium containing essentially a ketone formed by the hydrogenation of a phenol.

11. A process of manufacturing monomethyl-para-aminophenol, which process comprises decomposing para-hydroxyphenylglycine to monomethyl-para-aminophenol in a medium containing essentially an alcohol formed by the hydrogenation of a phenol.

12. A process of manufacturing monomethyl-para-aminophenol, which process comprises heating para-hydroxyphenylglycine in a medium containing essentially a hydrogenated phenol product at a temperature of about 140° to about 145° centigrade.

13. A process of manufacturing monomethyl-para-aminophenol, which process comprises heating para-hydroxyphenylglycine in methyl cyclohexanone at a temperature of about 140° to about 145° centigrade.

14. A process of manufacturing monomethyl-para-aminophenol, which process comprises decomposing para-hydroxyphenylglycine to monomethyl-para-aminophenol by means of heat in a protecting medium comprising essentially methyl cyclohexanone.

15. A process of manufacturing monomethyl-para-aminophenol, which process comprises heating a mixture of para-hydroxyphenylglycine and methyl cyclohexanone, in the proportion of about one part by weight of para-hydroxyphenylglycine to about five parts by weight of methyl cyclohexanone, to a temperature sufficiently high to cause decomposition of the para-hydroxyphenylglycine without causing decomposition of the methyl cyclohexanone.

16. A process of the character described, comprising decomposing para-hydroxyphenylglycine to monomethyl-para-aminophenol in the presence of methyl cyclohexanone, and stirring the reaction mixture with a solution containing an amount of sulphuric acid sufficient to convert the monomethyl-para-aminophenol base into monomethyl-para-aminophenol sulphate.

17. A process of the character described, comprising decomposing para-hydroxyphenylglycine to monomethyl-para-aminophenol in the presence of a hydrogenated phenol product, diluting the resulting mass with alcohol, and adding sufficient sulphuric acid to convert the monomethyl-para-aminophenol base into monomethyl-para-aminophenol sulphate.

CHARLES H. W. WHITAKER.